United States Patent
Ficalora

(10) Patent No.: US 8,239,255 B2
(45) Date of Patent: Aug. 7, 2012

(54) CONSUMER INCENTIVE SYSTEM AND BUSINESS METHOD

(75) Inventor: Joseph R. Ficalora, Westbury, NY (US)

(73) Assignee: New York Community Bancorp, Inc., Westbury, NY (US)

( * ) Notice: Subject to any disclaimer, the term of this patent is extended or adjusted under 35 U.S.C. 154(b) by 1681 days.

(21) Appl. No.: 11/280,380

(22) Filed: Nov. 16, 2005

(65) Prior Publication Data

US 2006/0206378 A1 Sep. 14, 2006

Related U.S. Application Data

(63) Continuation-in-part of application No. 10/841,208, filed on May 7, 2004, now abandoned.

(60) Provisional application No. 60/628,385, filed on Nov. 16, 2004.

(51) Int. Cl.
*G06Q 30/00* (2012.01)
(52) U.S. Cl. .................................................... 705/14.1
(58) Field of Classification Search .................. 705/14, 705/14.1
See application file for complete search history.

(56) References Cited

U.S. PATENT DOCUMENTS

| | | | |
|---|---|---|---|
| 2004/0193489 A1* | 9/2004 | Boyd et al. .................. | 705/14 |
| 2005/0149394 A1* | 7/2005 | Postrel ......................... | 705/14 |

\* cited by examiner

*Primary Examiner* — Daniel Lastra
(74) *Attorney, Agent, or Firm* — Handal & Morofsky LLC

(57) ABSTRACT

Consumer incentives are delivered by maintaining a database of consumer-customer club members and identification data. The retailing transaction is conducted by receiving a consumer-customer for a retail sales transaction at a first retail establishment. An identification input associated with said consumer-customer is received at the first retail establishment. The identification input is compared to the identification data to determine whether the identification input is associated with a consumer-customer club member. In response to a determination that an identification input which is associated with a consumer-customer club member, an incentive generating rule is applied to the retail sales transaction. In response to a determination that the identification input is not associated with a consumer-customer club member, a club membership is offered to the consumer-customer. In response to acceptance of the offer, a bank account is implemented, and associated with the accepting consumer-customer, at a banking institution the bank account is associated with an account number. A computing device is used to store in a database, associated with the banking institution, information respecting the bank account, associated with the accepting consumer-customer, at any banking institution. A banking transaction is conducted by receiving the identification input associated with the consumer-customer at the banking institution. A banking transaction request is received from the consumer-customer of the bank. The identification input is compared to the identification data to determine the consumer-customer club member with whom the identification input is associated. In response to the determination of the associated consumer-customer club member the banking transaction request is executed.

24 Claims, 9 Drawing Sheets

CONSUMER INCENTIVE SYSTEM AND BUSINESS METHOD

CROSS REFERENCE TO RELATED APPLICATIONS

This application claims the benefit of provisional patent application No. 60/628,385 of Ficalora filed Nov. 16, 2004, and is a continuation-in-part of patent application number 10/841,208 filed May 7, 2004, now abandoned of Joseph Ficalora. The entire disclosures of the above-identified applications of Ficalora are incorporated by reference herein.

STATEMENT REGARDING FEDERALLY SPONSORED RESEARCH OR DEVELOPMENT

Not applicable.

TECHNICAL FIELD

The present invention relates to the field of computer-implemented consumer incentive systems that may be implemented over a system that links reader terminals at supermarkets and other retailers to hardware registering credits and other incentives through a card encoded to communicate with financial databases and incentive crediting, structuring and measuring systems.

BACKGROUND OF THE INVENTION

While a first class of technological innovations are characterized by a relatively uniform cost to advantage factor over a range of small to medium-sized enterprises and beyond to larger enterprises, a second class of technological improvements, because of their relatively high cost, are susceptible of practical implementation only in large enterprises. Examples of the first class include such things as word processing, power tools, and so forth. More expensive technological innovations, such as large trucks, specialized manufacturing machinery, and other systems having a relatively high-volume throughput require substantially larger businesses to make cost-effective use possible.

In many businesses, the achievement of a minimum enterprise size is necessary in order to both deliver goods (and/or services) at competitive prices and generate the income necessary to pay workers higher salaries. Thus, increasing the size of an enterprise may be nothing less than a survival strategy. In the past, many businesses have designed various strategies for increasing their size. For many years, manufacturers of food products used coupons as a means to build their businesses.

Coupons can be mailed to new sales prospects. Likewise, coupons contained in boxes of products and good for the consumer's next purchase of the particular product in the box, or for the purchase of other products made by the manufacturer are a good means of building consumer loyalty.

Consumer loyalty is a very important factor, because, by delivering value to customers, businesses can reduce the cost of advertising, as well as other marketing costs, thus driving down the cost of bringing goods to market, delivering more value and instilling still greater loyalty. In principle, if the business has reached a mature size for a given marketplace, it need not expend marketing dollars to build its customer base. Rather, the expenditure of marketing dollars may be limited to that necessary to maintain market share in the face of otherwise unavoidable attrition, such as consumers moving out of the market area of the company, changing consumer tastes beyond the range of the organization to accommodate (for example, a change in a particular consumer's free time interest from television to oil painting), or the like.

As alluded to above, advertising is a principal means for enterprises to build and maintain market share. The problem with advertising is that it is broadcast to a wide diversity of people which, while it may include many real potential customers, also includes many non-prosp. The advertiser must pay the cost of reaching all these individuals. Moreover, advertising by its nature is self-limiting in many businesses, in the sense that prime prospects may not be in frequent enough contact with principal media on account of various lifestyle reasons including growing children, job pressures, physical disabilities and so forth.

Coupons have the possibility of solving some of these problems. For example, coupons contained within a box of a particular product for future sales of that particular product have the advantage of substantially reaching only customers interested in that particular product. Accordingly, coupons can offer a major cash incentives while still being cost-effective. Repeated couponing coupled with good product quality are a very effective means of maintaining market share and building customer loyalty. Likewise, line extension marketing, particularly after the requisite period of loyalty-building, and same product future sales couponing, is also a particularly effective means of extending market share in related areas.

However, coupons are a time-intensive task at the consumer end, and consequently they appeal to a limited market. Moreover, coupons may breed consumer resentment in non-users. Coupons slow down cash register lines, and show some consumers that other consumers are paying less for the same goods. In an attempt to deal with these problems, supermarkets often will make store circulars including coupons available at the cash register, thus allowing consumers to request a coupon and obtain a discount. However, this also has the unwanted effect of further slowing down the cash register lines and increasing impatience among other consumers.

In recent years, and an attempt to avoid these problems, electronic coupons have been introduced at many stores. Customers are given cards which they present at the cash register to obtain discounts on selected items as a reward for their loyalty. In addition, such electronic couponing has the advantage of generating demographic and marketing data, keyed to individual customers and their individual purchasing preferences. Thus, electronic couponing held out the potential of reducing costs with mechanisms and effects similar to that of paper couponing, but without the cost of paper distribution and with the additional payback of marketing data, enabling more precise and cost-effective marketing and concomitant increased delivery of value to the consumer.

However, in many cases the cards cause negative reactions from customers, who while making their purchases neglected to present them, thus resulting in their being charged a higher price and, perhaps, not realizing that until they have left the store. In an effort to avoid this sort of problem, cashiers are instructed to ask consumers if they have an electronic discount card, to remind those consumers, and, if the store decides that the policy is desirable, to enter a store discount number into the register to give the consumer the discount.

This, however, substantially neutralized many of the advantages of the electronic couponing system. Entry of the store card number negatives collection of marketing information. Making the coupon discounts available to all substantially destroyed the incentive of the coupon. While advertising costs for publication of coupons was avoided, the advertising value associated with the coupons was also lost.

Many service businesses also attempted to achieve growth in market share using consumer incentives to build and/or maintain market share. For many years, banks offered consumers gifts if they opened a new account at a particular bank. However, such promotions are of relatively limited value and are not generally employed today. Credit card issuers also attempt to build market share by offering consumers such incentives as airline miles, cash rebates and products in exchange for use of their credit card. In this respect, such incentive systems are reminiscent of much older stamp book promotion systems, where consumers were given books which were to be filled with stamps which were awarded in response to purchase size at each purchase. However, more modern systems have the advantage of avoiding the cost of stamps, books, distribution, and redemption.

SUMMARY OF THE INVENTION

In accordance with the present invention, customer loyalty is achieved without the cost and checkout register delays of coupon distribution and redemption, while at the same time avoiding consumer dissatisfaction associated with what may be perceived as unequal pricing structures. Nevertheless, loyal customers are detected and given pricing advantages in a discrete fashion without any losses of demographic marketing data. The inventive system provides these advantages consistently to loyal customers which the retailer wishes to reward without the consumer having to remember to present an identification card or similar device.

In accordance with the invention, consumer incentives are delivered by maintaining a database of consumer-customer club members and identification data. The retailing transaction is conducted by receiving a consumer-customer for a retail sales transaction at a first retail establishment. An identification input associated with said consumer-customer is received at the first retail establishment. The identification input is compared to the identification data to determine whether the identification input is associated with a consumer-customer club member. Each consumer-customer club member can be a customer of a banking institution associated with the club. In response to a determination that an identification input which is associated with a consumer-customer club member, an incentive generating rule is applied to the retail sales transaction. The incentive-generating rule can provide an incentive preferentially to consumer-customer club members versus non-members. The incentive-generating rule may operate in other suitable manner to promote customer loyalty and/or development of market share for the retail establishment and/or the associated banking institution.

In response to a determination that the identification input is not associated with a consumer-customer club member, a club membership is offered to the consumer-customer. In response to acceptance of the offer, a bank account is implemented, and associated with the accepting consumer-customer, at a banking institution the bank account is associated with an account number. A computing device is used to store in a database, associated with the banking institution, information respecting the bank account, associated with the accepting consumer-customer, at any banking institution. A banking transaction is conducted by receiving the identification input associated with the consumer-customer at the banking institution. A banking transaction request is received from the consumer-customer of the bank. The identification input is compared to the identification data to determine the consumer-customer club member with whom the identification input is associated. In response to the determination of the associated consumer-customer club member the banking transaction request is executed.

In accordance with the invention the receiving of an identification input associated with a consumer-customer at a first retail establishment comprises receiving an input generated by reading a credit card using a credit card reader.

The account number of the customer may be associated with information encoded in a card and the bank account is associated with an account number by giving the card to a consumer and receiving of the identification input associated with the consumer-customer is done at the first retail establishment by inserting the card into a credit card reader.

The inventive apparatus provides for delivering consumer incentives and comprises a data storage device with a database of consumer-customer club members and identification data recorded thereon. An identification device identifies a consumer-customer for a retail sales transaction at a first non-banking retail establishment. A computing device is programmed to apply an incentive generating rule to said retail sales transaction. A detector receives an identification input associated with the consumer-customer from the identification device. The detector is located at a banking establishment and determines whether they identification input is associated with a consumer-customer club member having an associated bank account at a banking institution. A computing system associated with said banking institution is programmed to compare said identification input to identification data to perform a retail banking transaction for the consumer-customer.

BRIEF DESCRIPTION OF THE DRAWINGS

The operation of the invention will become apparent from the following description taken in conjunction with the drawings, in which.

DETAILED DESCRIPTION OF THE PREFERRED EMBODIMENT

Figure 1:
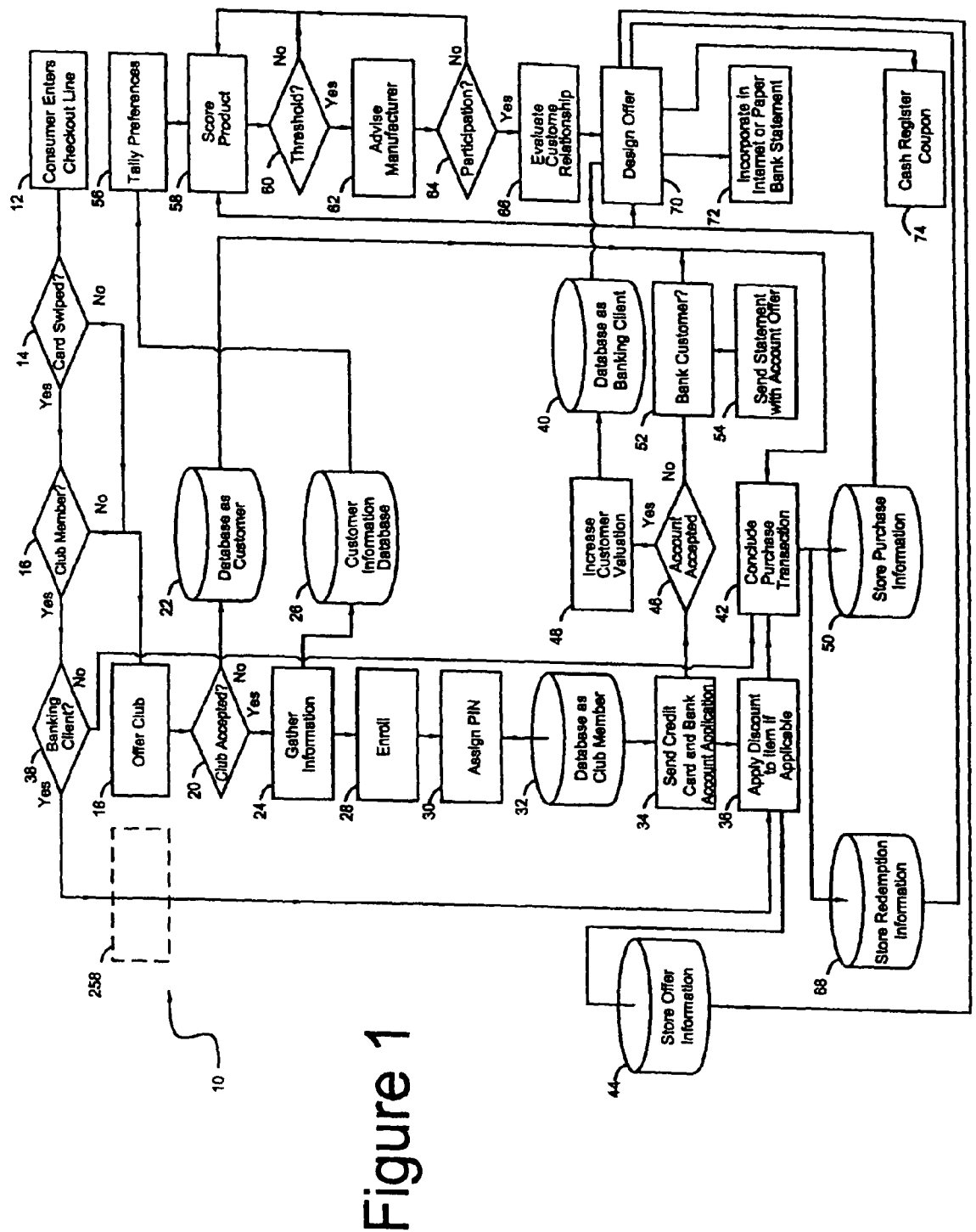
FIG. 1 is a block diagram illustrating that portion of the method of the present invention as is implemented at a retailer such as a supermarket.

In accordance with the present invention, it is possible for a customer to enter the system through any establishment in communication with the inventive system. In the illustrated embodiment of FIG. 1, a bank is in communication with a supermarket. In accordance with the preferred embodiment, several retail bank branches, working through a central office of the bank, are linked together with numerous retail establishments, for example, supermarkets.

While it is contemplated that the supermarkets associated with a bank may all be part of a single supermarket chain and share the same trademark, the inventive system is equally applicable to multiple supermarket operators. However, optimization of the model depends upon focusing supermarket traffic to a single location in a given geographic area keyed to the density of supermarkets in the area, transportation infrastructure, population density and the economies of scale of operating a supermarket. More particularly, a supermarket, or supermarket chain, is accepted into the system if it is a reasonably economically viable best fit to the ideal.

Ideally, a supermarket unit in the inventive system is close enough to enough consumers to operate efficiently with the number of consumers afforded by an achievable market share, without the consumers being forced to undertake excessive travel, while at the same time the ideal supermarket unit (or chain) would be closer to those consumers (or at least not much further) than competitive supermarkets. While fit to the ideal is a good first approximation to determining the inclusion of a supermarket or supermarket chain into the system, other factors may influence the decision. For example, is a market particularly well-run, or does it offer better quality or greater selection.

Another very important factor is whether the market is associated with other markets which are similarly situated. This is important because if the supermarkets are part of a chain, the inventive system may be implemented more efficiently and at significantly lower cost.

Another important factor to be weighed in the assessment of a candidate supermarket or supermarket chain is the average proximity of the supermarket locations to the locations of the cooperating business, in the instant example, the locations of retail branches of a bank. For example, if the bank has retail branches in supermarkets, the supermarkets in which the retail bank is housed would be ideal candidates for a cooperative implementation of the inventive system.

It is to be understood that the above discussion respecting rating is highly variable, depending upon individual circumstances, and the availability and assessment of the value of potential cooperation between different types of retail establishments. Thus, potentially no one factor is overwhelmingly important and must be followed, and potentially no factor is so serious that it cannot be ignored. However, the overall assessment of factors in accordance with the implementation of the invention may be compelling in some situations and completely neutral in other situations.

Referring to FIG. 1, the methodology 10 employed at the checkout line of a supermarket in accordance with the present invention is illustrated. After shopping the store and picking out the items which are desired, the consumer enters the checkout line at step 12. At step 14, the system determines whether a credit card has been swiped across a reader. If the system detects a card, it determines whether the card is part of the system and whether the consumer is a member of the group using the inventive system. If the system determines that the consumer is not a member at step 16 because the swiped card is not recognized, or whether this recognition is made at step 14 because no card is swiped, the system proceeds to offer club membership to the consumer at step 18 by prompting the checkout cashier with an onscreen display, utilizing, optionally and preferably, the existing display at the checkout register.

In accordance with the present invention, implementation of consumer incentives can be keyed to use of a special credit card issued by the cooperating bank institution as described below in connection with FIG. 2. Nevertheless, if the consumer does sign up for the program associated with the inventive system and method at the cash register, the consumer is temporarily allowed to use another credit card, perhaps for a fixed period of time, such as thirty days, or such other smaller or longer period of time necessary to implement a credit card.

At step 20, if the club is not accepted, the customer is databased as a supermarket customer at step 22, and the system proceeds to conclude the transaction at step 42.

In accordance with the invention, in principle, a supermarket customer, at the supermarket checkout counter may become a bank customer. However, the alternative also exists for the customer to be directed to go to a branch of the bank, perhaps an in-supermarket branch, and become a bank customer there.

The courtesy discount may be extended on a one-time basis to the customer. Alternatively, no discount for points may be extended for any purchases by into the customer becoming paid club member. Alternatively, the discount may be delayed until the next time that the customer visits the supermarket. At that point, the discount or points would be applied.

Also in accordance with the invention, a customer who is offered a club membership and has indicated an interest in the same, may be identified in an e-mail sent from the supermarket checkout counter to the bank. Such identification may be by way of information taken from a credit card.

If, on the other hand, the customer indicates an interest in becoming a club member at step 20, the system proceeds at step 24 to gather information about the customer. Because club members are both banking customers and users of the supermarket, it is necessary to gather all information which is required in the case of setting up a banking relationship with a consumer. This can be done, for example, by handing the customer a form, or filling the form out for the customer directly. Alternatively, an alphanumeric device can be used to input information with the input being done by the customer or it may be done by the cashier. Finally, it is unnecessary to have an alphanumeric device, if the information to be entered into the system can be presented in multiple-choice format, or other format, thus simplifying the device which inputs the information. For example, in accordance with the invention, one may use the terminal of a credit card swiping device to present alphanumeric questions and potential answers adjacent buttons associated with each potential answer.

Once the information has been gathered at step 24, the system puts the information in a database 26 which stores customer information. In accordance with the invention, it is contemplated that information useful in connection with buying habits, banking habits, and/or other habits which may be of interest to many businesses operating the inventive system is stored by the system. Such information may be direct information, or it may be information generally describing the customer to see if the customer fits the profile for certain goods and/or services of the type provided by system operators.

At step 28, the system then recognizes the individual as a new participant and, at step 30, assigns a personal identification number to the participant. Once the individual has a personal identification number, at step 32 the identity of the individual is stored.

If desired, it is not necessary that all information be taken from the customer at step 24. Alternatively, at step 34 additional information may be taken in order to have all information necessary to open a bank account and assign a credit card to the club member. This may be done at step 34 by sending, by e-mail or other method an application form for a bank account.

In accordance with the invention the information on the application form, regardless of how it is taken, is transmitted to the bank which goes through its normal procedures to determine whether it will accept the application and establish a banking relationship with the introduced individual.

Once the consumer indicates that he or she desires to open an account, the system proceeds at step 36 to apply a discount to the applicable items. In similar fashion, if, at step 16, the consumer indicated that he was a card member, the system proceeds to step 38, where the system determines whether the consumer is a banking client by consulting the database of banking clients 40. Database 40 is generated in a manner which is described below. If the checkout line customer is a banking client, the system proceeds at step 36 to apply a discount and then to conclude the purchase at step 42. Likewise, new club members, after they have the discount applied to their applicable items at step 36 are sent to step 42 where the purchase transaction is concluded. If it is determined that the checkout line customer is not a banking client at step 38, the system proceeds directly to step 42 and concludes the purchase transaction.

The discount applied is a function of offer information generated within the system and stored at step 44, as will be described in detail below.

In accordance with the invention, if, the bank account and credit card application sent at step 34 is accepted at step 46, the system proceeds to step 48, where the valuation of the customer is increased because of the credit card relationship. It is noted that in accordance with the present invention, it may be justified and therefore implemented to increase customer valuation as increasing numbers of different types of outlets are added by the customer to his membership, whether the same are added pursuant to a formal application process or, whether, in accordance with the preferred embodiment, the outlets are added automatically as a consumer uses the same.

Accordingly, such information sent to a database 40 which reflects the identification of the customer as a banking client or customer of other outlets and indicates his valuation. This information is used as an input in promotional offers designed by the system and presented in accordance with the present invention.

Once the purchase has been completed at step 42, the system proceeds to step 50 where purchase information is stored for future reference and, in particular, used in the design of future offers to the consumer. It will be understood that in the present invention, the purchase information is specifically associated with each consumer for the purpose of designing an offer likely to be found attractive by the consumer. In accordance with the invention, the offer may be of a known product and brand which the consumer is known to be purchasing in order to bring the consumer into the store. Alternatively, it may be a competitive brand of a product similar or the same as that purchased by the consumer in the past in order to confer an advantage on a supplier of the competitive products to the supermarket.

If any charge account is accepted by a consumer at step 46, the system proceeds to step 52 where determination is made as to whether the consumer is a bank customer.

At step 52, the system also responds to the databasing of the consumer as a supermarket customer at step 22 to determine whether he is a banking customer. If it is found that the supermarket customer, who is also a banking customer, but is not a club member, a statement is sent at step 54 in the normal course of business, but including an offer to join the club and take a credit card.

Periodically, information stored in the customer information database at step 26 is tallied at step 56 for the purpose of future offer design. In the course of doing this, various products are scored at step 58, as part of the process of taking out products for promotional activities. If a product reaches the threshold for qualifying, this information is determined at step 60. If the determination is negative, the system returns to step 58 to score other products. If, on the other hand, a product scores sufficiently high to be considered, the system proceeds to step 62 where the manufacturer of the product is advised of the information and invited at step 64 to participate in a promotional activity. If the manufacturer declines to participate, the system considers participation by other manufacturers returning to product scores considered at step 58. If, on the other hand, the manufacturer does agree to participate, the customer relationship for each of the customers is evaluated at step 66, then using as input one or more of the information sets contained in databases generated at step 40, and step 44, and redemption information generated at step 68 in response to purchases (and using other information, if desired), the system designs an offer at step 70. This offer is incorporated into paper or Internet based bank statements at step 72 in addition, this offer it can be sent to a cash register coupon generating machine, located at the point-of-purchase, at step 74 when the customer next goes to the supermarket.

In accordance with the invention, it is noted that the Internet may be used to communicate all information. However, existing banking infrastructure relies on other communications channels, paper, and so forth. Accordingly, it is contemplated that the present invention will utilize the existing channels of communication. More particularly, it is contemplated that software linking existing card readers, credit/debit card readers, banking kiosks, and the like will implement the invention in the infrastructure of existing bank branches, supermarkets, and so forth.

Figure 2:
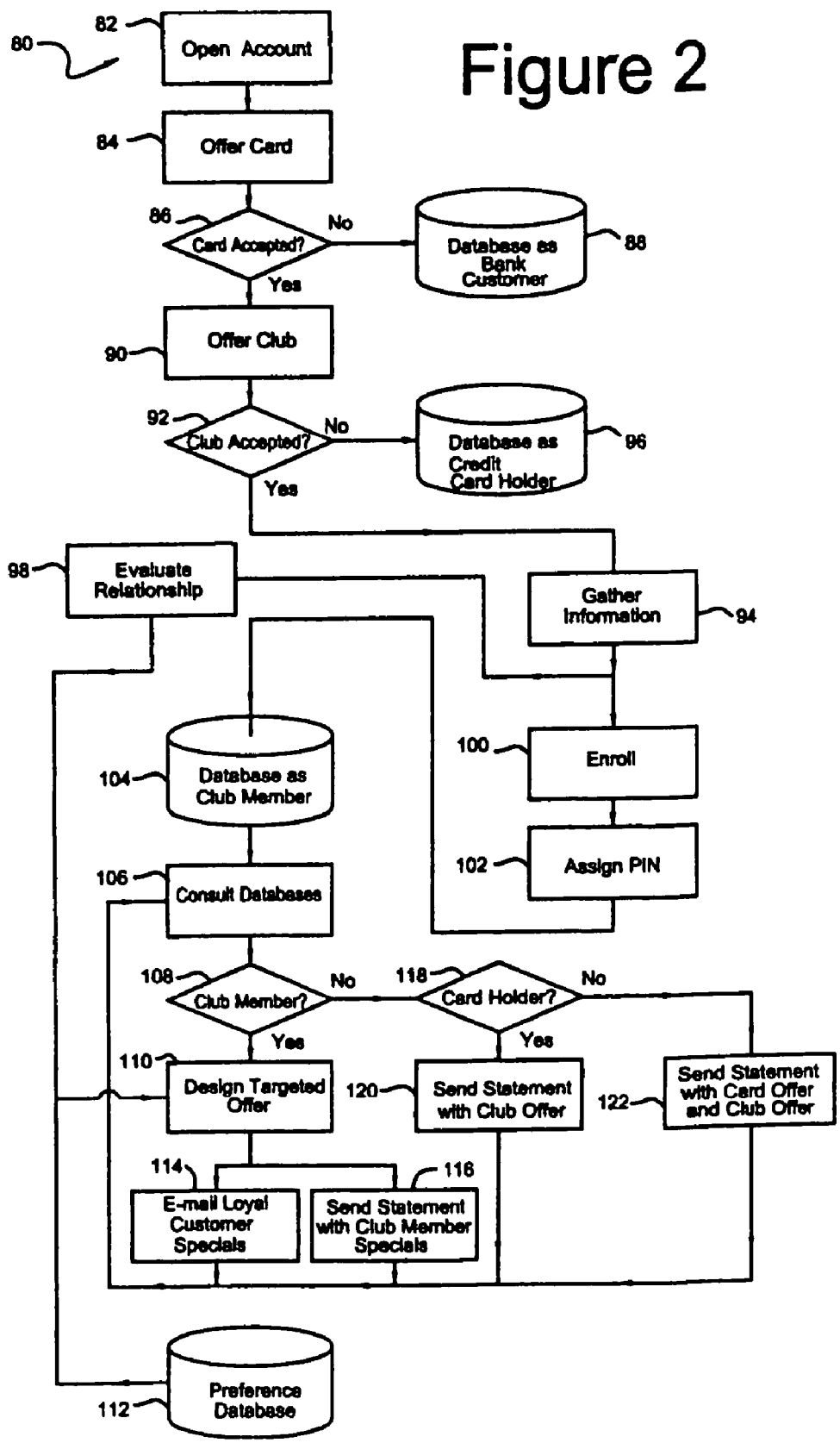
FIG. 2 is a block diagram illustrating that portion of the method of the present invention as is implemented at a banking institution.

An illustrative embodiment of the inventive method 80 at the retail banking site of the system is illustrated in FIG. 2. In accordance with the invention, the customer opens an account at step 82. The inventive method may be applied to an account which is open for the purpose of implementing the invention, or it may be applied to an existing account which has been previously opened by the client at step 82 a number of days, weeks or years prior to the institution of the system of the present invention at the banking institution. At step 84, the banking client is offered the opportunity for a credit card in accordance with the present invention. Such offer may be made when the account is opened, or it may be made at a later date when the customer is in the branch, or the offer may be made over the Internet or in the mail.

If a credit card is not accepted by the consumer at step 86, at step 88, the customer is databased as a bank customer without a credit card. On the other hand, if, at step 86 the customer accepts a credit card from the bank, the customer is offered club membership with discounts associated with use of the card at step 90.

If the consumer accepts the special club credit card at step 92, the system proceeds to gather information at step 94, as may be required to implement an incentive program. This step is comparable to the gathering of information which occurs at step 24 in FIG. 1, where a supermarket is the institution initiating the club membership. In the event that the consumer does not elect to join the club at step 92, the system proceeds to step 96 where the banking customer is databased as a banking customer with a credit card but who is not a club member.

After information has been gathered at step 94, the system evaluates the relationship at step 98. The system then enrolls the customer at step 100 and assigns a personal identification number at step 102. The customer is then databased as a cardholder and club member at step 104.

After a predetermined period of time, for example monthly and with the customer's bank statement, at step 106, the system consults the databases at step 106. The system then proceeds at step 108 to determine whether the individual bank customer is a club member. If the individual is a club member, the system designs a targeted offer at step 110, based upon the relationship evaluation performed at step 98 and also based upon information contained in a preference database generated in the method of FIG. 1 and stored during database storage steps 68 and 50. Offer design may also be made responsive to other factors, as is illustrated by the embodiment of FIG. 1.

Once a targeted offer has been designed at step 110, the offer is sent by e-mail to loyal customers, if desired at step 114. Alternatively, or in addition to e-mail transmission of the offer, the offer may be included in a conventional paper bank statement which is sent at step 116.

If, on the other hand, if it is determined at step 108 that the individual is not a club member, the system proceeds at step 118 to determine whether the individual holds a bank credit card. If the individual does hold a bank credit card, he is sent a statement at step 120. Such statement may include an offer to join the club.

On the other hand, if it is determined at step 118 that the individual is not the holder of a bank credit card, the individual is sent, at step 122 a statement with his monthly account statement offering a credit card and offering membership in the consumer incentive club implemented by the inventive system.

Figure 3:
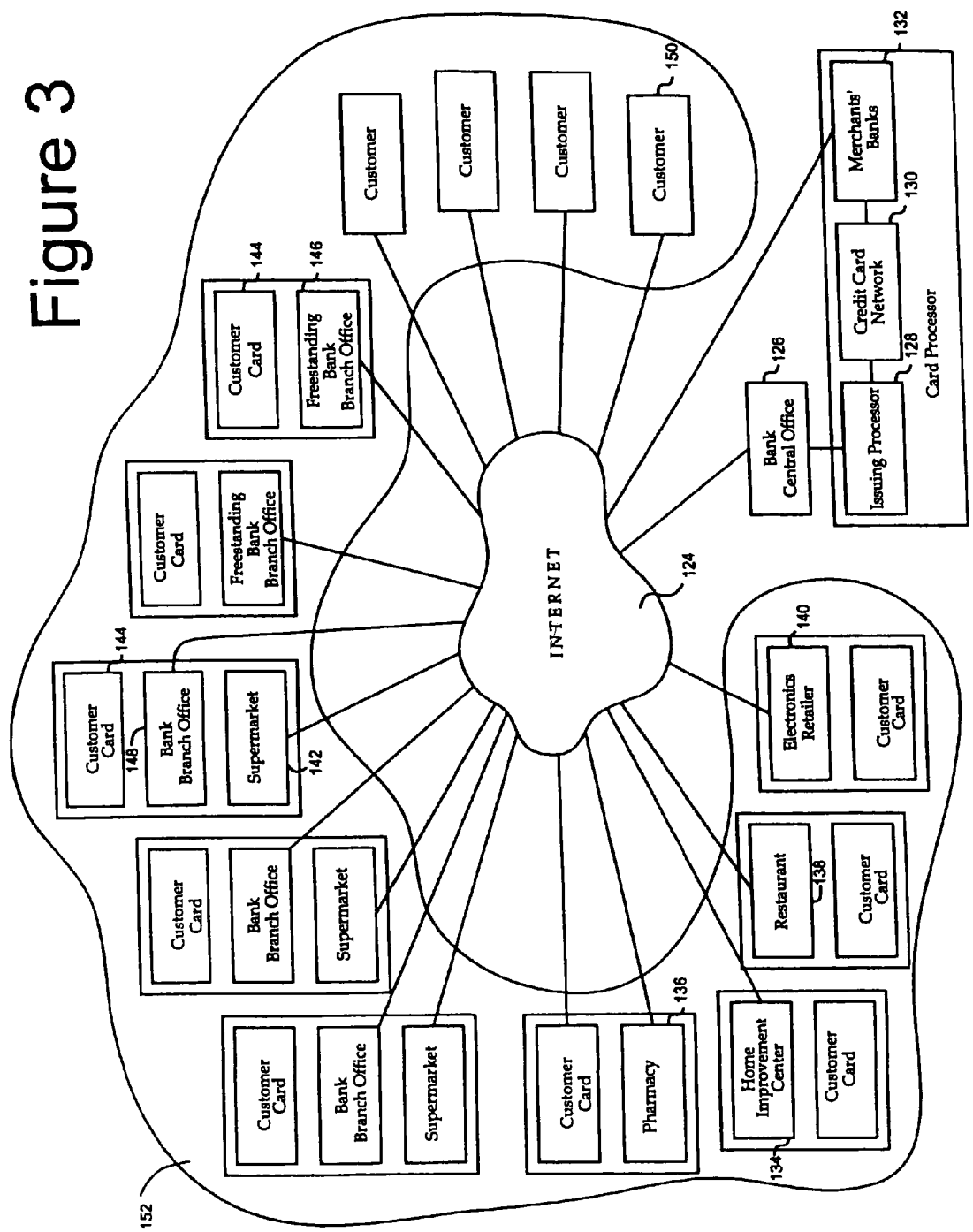
FIG. 3 illustrates the deployment of the inventive method in a system located in a single neighborhood of a first character.

In accordance with the present invention, it is contemplated that the Internet 124 may be used to implement the inventive system, as illustrated, for example in FIG. 3. The exemplary embodiment of the invention illustrated in FIG. 3 includes a bank central office 126. The central office 126 of the bank is in communication with an issuing processor, which in turn is in communication with a credit card network 130. Credit card network 130 has relationships with merchant banks 132 which, in turn, communicate through the Internet 124 with various merchant establishments such as home improvement center 134, pharmacy 136, restaurant 138, electronics retailer 140 and supermarket 142.

Conventional credit card terminals or the like may be employed at these various retail establishments to interface with customer cards 144 carried by customers into the establishment. Likewise, customer cards 144 may be used in free-standing bank branch offices 146 and also in in-supermarket bank branch offices 148.

As detailed above, it is contemplated that in accordance with the present invention, customers, for example customers 150 within their own homes, are contacted via the Internet 124. Conceptually, the system illustrated in FIG. 3 may be viewed as a system for a town or neighborhood 152.

Figure 4:
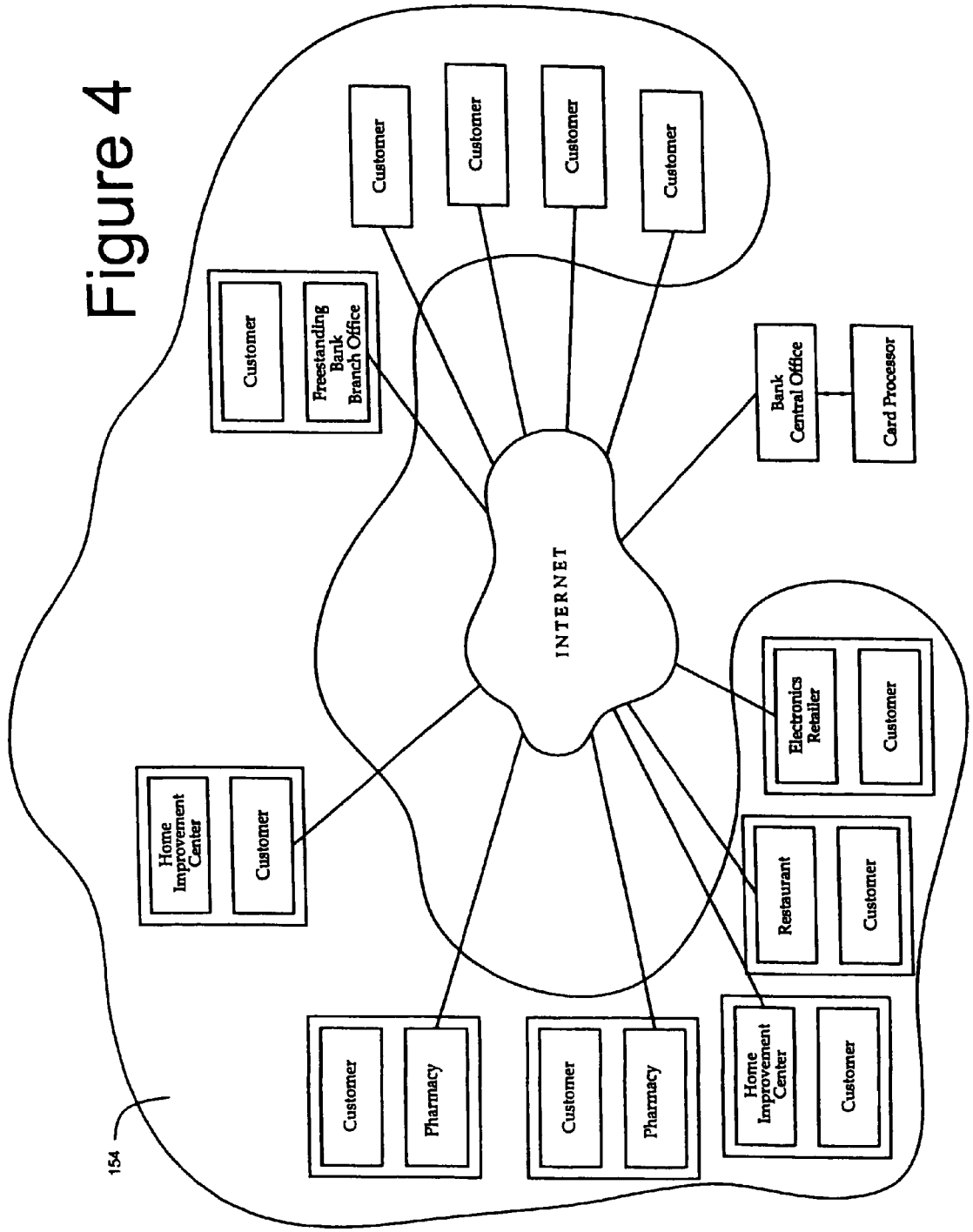
FIGS. 4-5 illustrate the deployment of the inventive method in systems located in a single neighborhood of a second and third characters.
Figure 5:
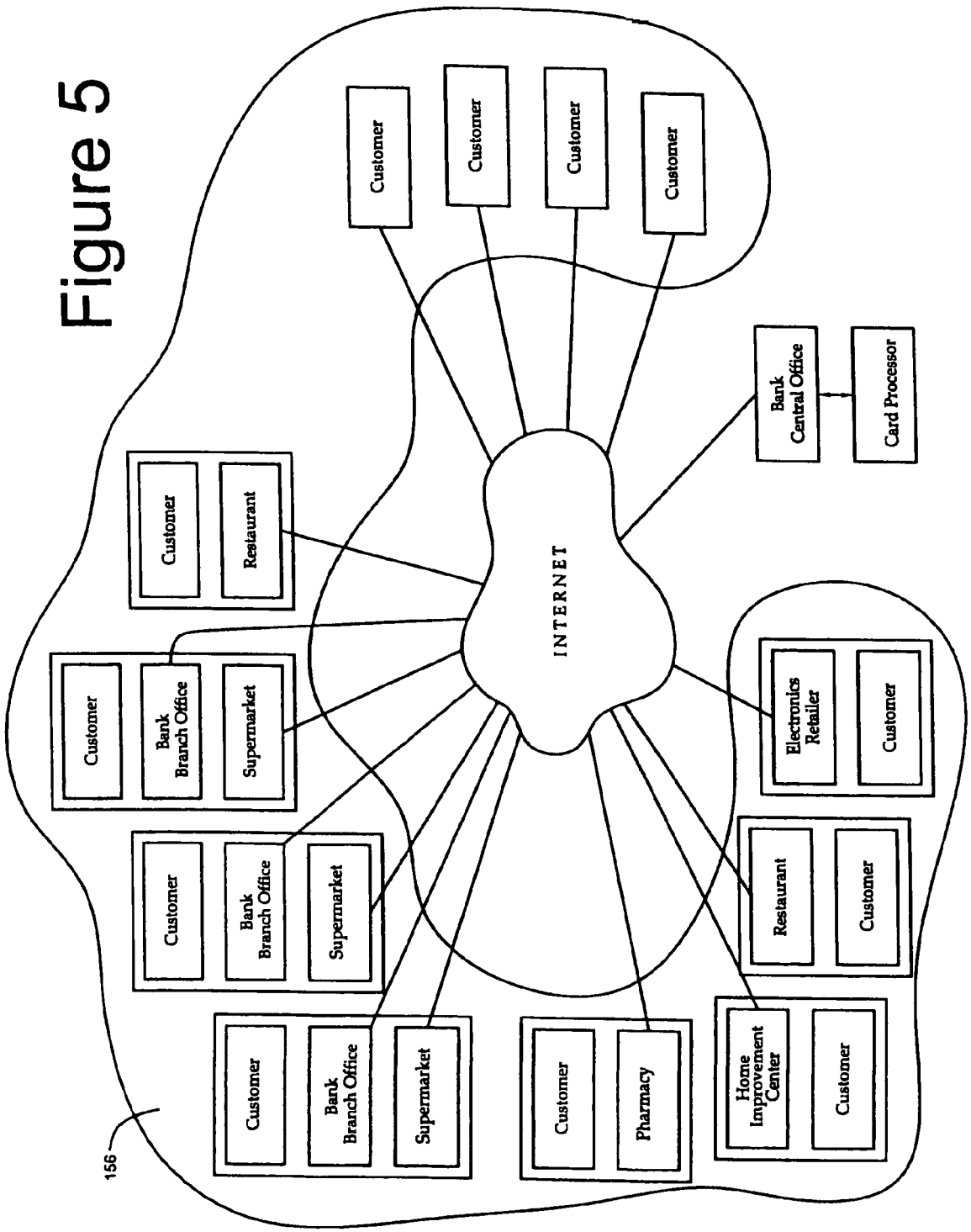
Figure 6:
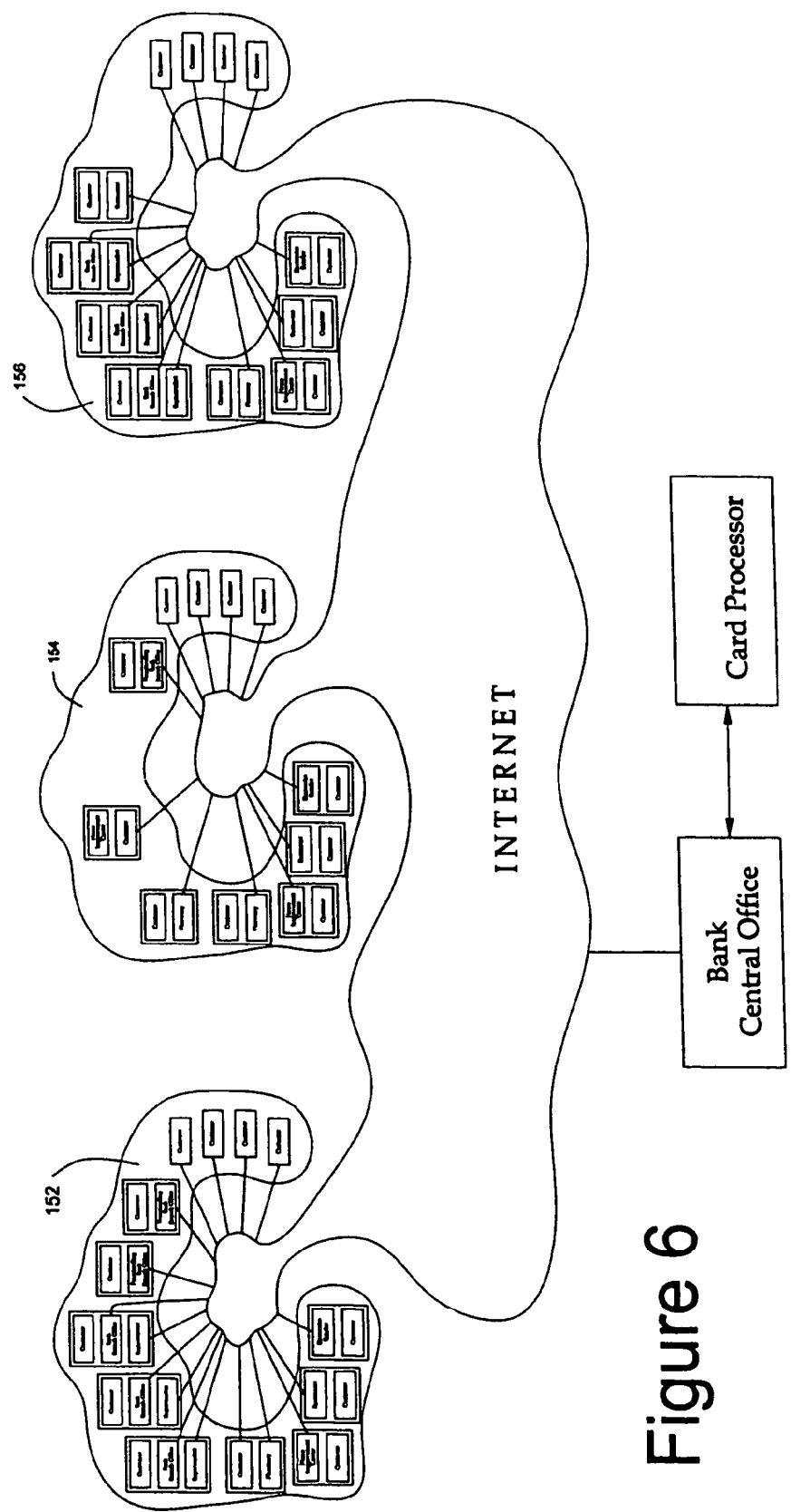
FIG. 6 illustrates the deployment of the inventive method in a system located in a multiple neighborhood configuration

As was alluded to above, in accordance with the present invention, the inventive system may take a wide variety of configurations. For example, the system may be implemented in a neighborhood with only a single viable supermarket which does not have an in-supermarket retail banking outlet, as illustrated by neighborhood 154 in FIG. 4. Likewise, as illustrated in FIG. 5, the inventive system may be deployed in still other alternative configurations, such as the one illustrated for neighborhood 156. Finally, as illustrated in FIG. 6, a central banking institution may operate a plurality of inventive systems in a plurality of neighborhoods or towns, for example, as a single unitary system.

Figure 7:
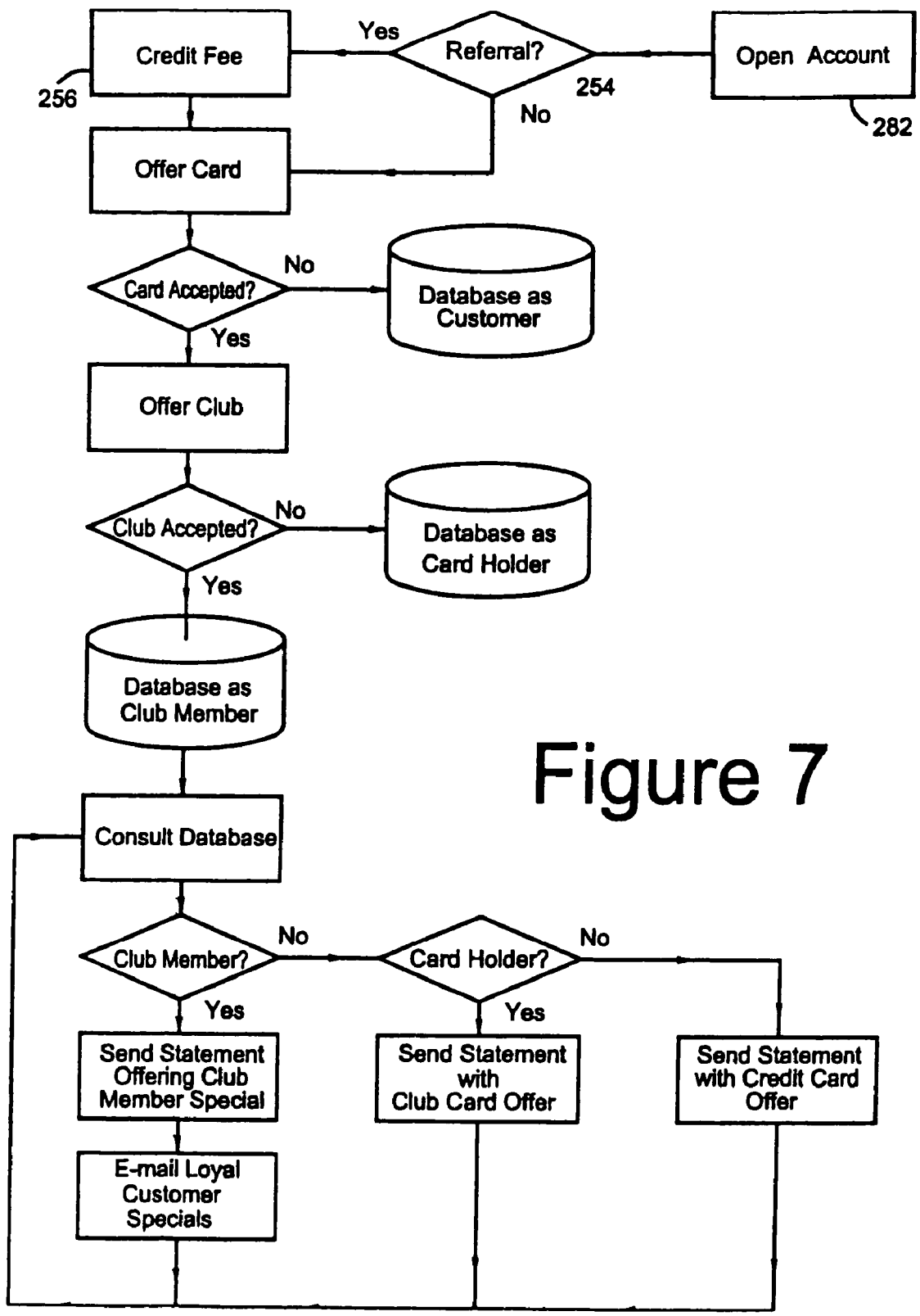
FIG. 7 illustrates alternative methodology in accordance with the present invention for implementation of the inventive method at a bank.

Yet another system constructed in accordance with the present invention is illustrated in FIG. 7. In this embodiment, which is similar to the system illustrated in FIG. 2, when the customer opens an account at step 282, the system determines at step 254 whether the client is a new client to the bank which has been referred by another retailer. In the event that such a retailer, such as a supermarket, has been involved in the sale, the same is noted by the system and the referring retailer is credited at step 256. The system then proceeds, with a methodology similar to that of the embodiment of FIG. 2. However, it is noted that the number of steps have been simplified in the embodiment of FIG. 7, as is apparent from the flowchart step denominations. It is noted, however, that the crediting of a fee to the retailer by the bank upon the acquisition of a new customer as determined at step 254 may be applied to a relatively elaborate banking system, such as that of FIG. 1. Generally, it is noted that both FIGS. 1 and 7 are exemplary of the invention and that the same may take various forms following the teachings contained herein.

Referring back to FIG. 1, is also possible for a referral fee to be paid by a supermarket or other retailer customer to a bank upon receiving a new customer. The same would be done by interposing a step 258 between decisions at step 38 and discount application step 36 in which it is determined whether the supermarket customer has been introduced to the supermarket by the bank. Such determination may be made by, for example, checking a database of banking customers against the name associated with the credit card swiped by the customer.

A payment of a referral fee may be made in the form of a percentage of the transaction. Alternatively, this payment may take the form of a relatively high percentage of the transaction, but which would decline over a period of time. This sort of payment structure may also be applied to the fee credited to a retailer by a bank when a new customer is introduced to the bank by the retailer. In connection with the FIG. 7 embodiment, it is also noted that the fee credited to the retailer may take the form of a reduced percentage fee for banking services paid by the retailer.

Figure 8:
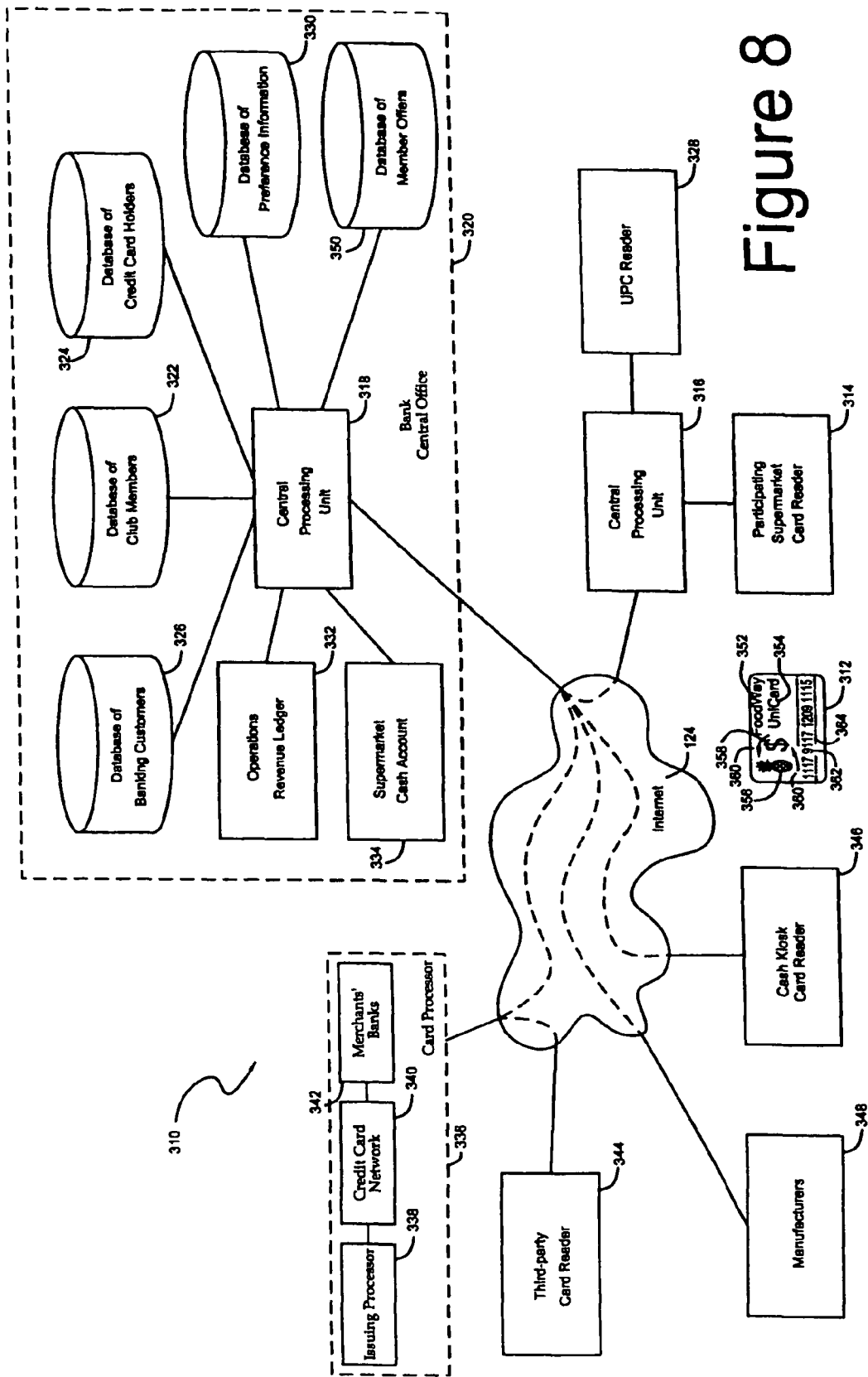
FIG. 8 illustrates a system implementing the inventive system.

System hardware for implementing the system of the present invention is illustrated in FIG. 8. Generally, the system might look like the system presented in FIG. 6. To understand the functional interaction of the various elements illustrated in FIG. 6, subparts of various systems are illustrated in FIG. 8. More particularly, in accordance with the invention, it is contemplated that a system 310 constructed in accordance with the present invention will be centered on a card 312 to be carried by the consumer. Card 312 may be read by numerous readers, and functions as a conventional credit or debit card and as a cash card for a bank, in the instance of the present invention, the bank operating the inventive system 310. In accordance with the invention, card 312 is carried by the consumer and also functions as a premium value card. More particularly, when the consumer uses the credit or debit card at a supermarket, for example, where the consumer is a member, the use of the card in the transaction to charge, for example, groceries which the consumer is purchasing, also functions to trigger special discounts when it is read by the credit card reader 314 at the checkout line of the cash register of the participating supermarket. Credit card reader 314 communicates identification information encoded on card 312 to central processing unit 316. This information is then communicated via the Internet 124 to the central processing unit 318 located at bank central office 320.

At bank central office 320, central processing unit 318 communicates with database of club members 322 to determine whether the individual at the cash register is a member of the club. At the same, if a negative determination is made, the databases are checked to determine whether the individual is a credit card holder for the bank. This is done by consulting with database 324.

In accordance with the invention, incentives may take a wide variety of forms. For example, the holder of an existing credit card may be informed that he may have a discount option activated. Alternatively, the credit card holder may be given an offer to receive a co-branded credit card, that is a credit card with the trademark of both the bank and the participating supermarket on it, and carrying enhanced privileges.

However, in accordance with a preferred embodiment of the invention, the credit card customer is given the option of discounts without enrolling for a new credit or debit card, in order to maximize the number of acceptances of club membership by minimizing the restrictions on implementing club membership. Thus, a customer with a credit card belonging to a bank other than the bank operating the inventive incentive system, may, in accordance with one embodiment of the invention, choose to have that credit card linked to discounts at the supermarket. However, such discounts to non-operator credit cards may be reduced to build an incentive to do business with the bank which is operating the inventive system. However, once an offer of a new credit card issued by the operator of the inventive system is accepted, the consumer is sent, via the mails, a co-branded card.

In similar fashion, if a check of databases 322 and 324 indicates that the individual at the cash register is neither a club member nor a credit card holder with the bank operating the inventive system, the system checks database 326 to determine whether the individual is a banking customer without a bank credit card. If the individual is not a banking customer, other databases may be consulted to determine the address of the individual for the purpose of sending out a solicitation of club membership including a banking relationship, and credit card with incentives at the participating supermarket. Such solicitation may be sent in connection with a monthly banking statement.

After the credit card has been swiped across the credit card reader by the consumer, information, respecting purchases, which was input into the system either manually or through universal product code reader 328 is downloaded through central processing unit 316 over the Internet 124 to central processing unit 318 of bank central office 320. Central processing unit 318 stores this information in preference database 330.

It is noted that whether or not the individual is banking or club member (and it is noted that in accordance with the present invention a club member need not be a banking client, although in accordance with the preferred embodiment the club member is given a credit card or debit card of the participating bank), information respecting purchases is sent to database 330.

Depending upon the arrangements reached between the participating retailer supermarket and the bank, depending upon whether it is a bank account being implemented, or a customer being referred to the supermarket, or a fee for the banking services associated with the transaction involved, the operations revenue ledger of the bank 332 is given a cash credit or debit. Similarly, the supermarket cash account 334 is given a corresponding debit or credit.

In accordance with normal banking practices, the card processing group 336 comprising an issuing processor 338, a credit card network 340 and merchant's bank 342 perform their normal functions. It will be understood that in accordance with the present invention, card readers 344 not associated with participating retailers in the instant system may still be connected to the card processing group 336. Moreover, the operation of the instant invention may be carried out without interfering with non-participating network operations.

Likewise, cash kiosk card readers 346 belonging to, for example, the participating banking institution may be operated side-by-side with the inventive system or supplement the services offered by the inventive system.

In accordance with the invention, information in the database of preference information 330 may be communicated to participating manufacturers 348, or prospects likely to be participating manufacturers. The identities of the manufacturers 348 participating in the inventive system and the information in the database of consumer preferences 330 may be used to generate offers for consumers which may be stored in database 350.

In accordance with the invention, the inventive system utilizes a card 312 which is also compatible with third party card readers 344 and cash kiosk's associated with the banking system, such as cash kiosk 346. In addition, it carries the brand 352 of a retailer, such as a supermarket and the brand 354 of a banking institution or any credit card system, such as the Visa credit card system. In addition, it may bear the design trademarks of both retailers. Alternatively, the design trademarks of the retailers may be replaced by symbols showing what the retailers do. For example, a pineapple 356 may used to symbolize a supermarket operator. In similar fashion, a bank-like building or a "$" 358 may be used to symbolize a banking retailer. In addition, symbols such as arrows 360, or Ying and Yang, may be used to symbolize the cooperative relationship. In addition, the card number of the subscriber 362 may be imprinted on the card, and among the information encoded in a magnetic stripe 364 on the reverse side of the card.

Figure 10:
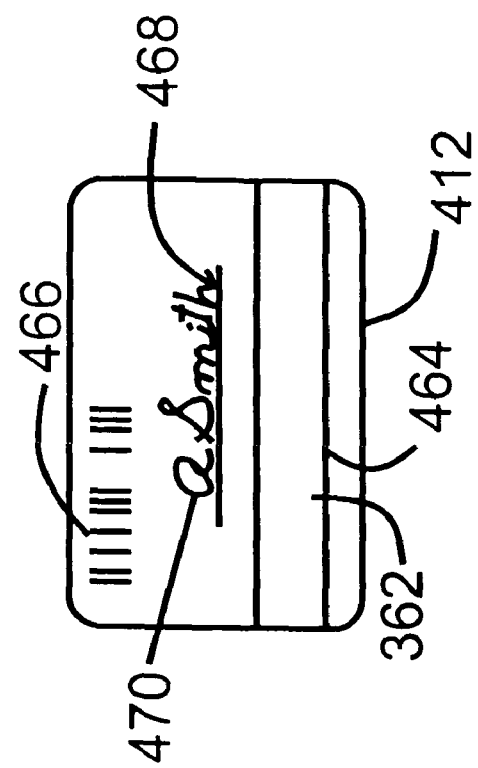
FIGS. 9-10 illustrate the front and back of a card for implementing an alternative method in accordance with the present invention.
Figure 9:
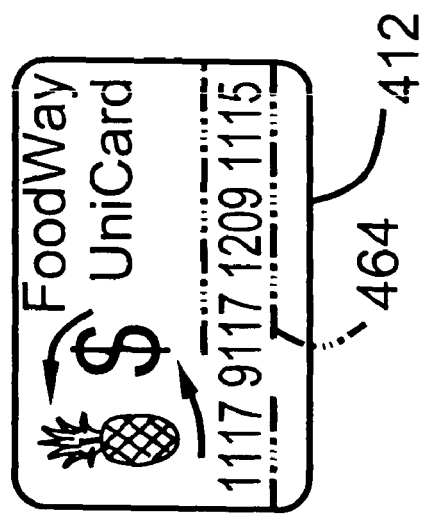

While, in principle, in the context of the first implementation of a technology, the use of a single magnetic stripe to provide card identification is the simplest and most straightforward approach, implementation in the context of a retrofitting of the invention to existing technology suggests the implementation of a hybrid identification structure. More particularly, in accordance with the relevant portions of the embodiment illustrated in FIG. 8, identification of the user to the store's incentive system, as well as to the credit card issuer and bank is done by magnetic stripe 364. As illustrated in FIG. 9, in accordance with an alternative embodiment of the invention, a card 412 includes all the elements of card 312 in FIG. 8, including a magnetic stripe 464 as well as a UPC bar code 466 which identifies the user to the store club program. The front of the card is illustrated in FIG. 9 as the back of the card is illustrated in FIG. 10.

When card 412 is used by the cashier, the cashier illuminates code 466 (FIG. 10) with the interrogation signal from the UPC code reader, thus activating the inventive consumer incentive system. In addition to this, the consumer uses the card to swipe a card reader located at the checkout counter to activate the credit card or debit card function of card 412. In similar fashion, magnetic stripe 464 may be used at the bank cash machine or to otherwise identify the user of the card. As is customary in credit cards, in the event the card 412 is a credit card, a signature line 468 on reverse side of the card (FIG. 10) is provided to receive signature 470.

Other embodiments of credit card or debit card or other consumer deployed transaction-enabling device, will be apparent to those skilled in the art. For example UPC bar code 466 may replace magnetic stripe 464 or other data storage means such as an RFID device may be employed in addition to or in place of magnetic stripe 464 or bar code 466. If desired, limited data processing capability or machine intelligence, with associated data storage, may be provided on the transaction-enabling device. The transaction-enabling device can be, for example in one embodiment of the invention, a so-called "smart" card. Such a transaction-enabling device can be updated dynamically, at the point-of-sale or other transaction point, with information related to the customer's transaction activities which may be employed in determining future incentives or for other useful purposes.

While an illustrative embodiment of the invention has been described, it is understood that various modifications will be obvious to those on ordinary skill in the art. Such modifications are within the spirit and scope of the invention which is limited and defined only by the appended claims.

The invention claimed is:

1. A method for psychologically building loyalty in customers of associated businesses to promote the efficient operation of said business, reducing advertising and infrastructural operational costs, said businesses including a first retail establishment and a financial institution, by implementing a computer based customer loyalty system delivering consumer incentives individually tailored to individual customers, said incentives being determined by execution of an algorithm based on customer valuation resident in said computer to generate a value of the relationship between the customer and the businesses, comprising:
   (a) inputting, into a computer associated electronic database of identifications of consumer-customer club members having an associated financial account at said financial institution, identification data associated with said consumer-customer club members;
   (b) conducting a retail sales transaction with a customer on a first electronic infrastructure associated with said first retail establishment, comprising:
      (I) receiving product data concerning said retail sales transaction with said customer and storing said product data in a customer information database, said data being received at an electronic facility incorporating a checkout register functionality in said first retail sales establishment;
      (II) receiving electronically an identification input associated with said customer at said first retail establishment; and
      (III) electronically comparing said identification input to said identification data to determine whether said identification input is associated with a consumer-customer club member having an associated financial account at said financial institution;
   (c) in response to a determination that said identification input is associated with a consumer-customer club member having an associated financial account, executing an algorithm embodying an incentive generating rule to said retail transaction to determine an incentive, said incentive generating rule being based upon product and/or service data relating to prior retail transactions, and a value of a relationship between said consumer-customer club member and said businesses, said incentive having a value directly proportional to said value of said relationship between said consumer-customer club member and said businesses, said incentive being determined by execution of an algorithm, said incentive being based on said value of said relationship between said consumer-customer club member and said businesses, resident in said computer;
   (d) in response to a determination that said identification input is not associated with a consumer-customer club member, offering club membership to said customer;
   (e) in response to acceptance of said offer of club membership, implementing an associated financial account, associated with said accepting customer, at said financial institution, by inputting, into said electronic database data to be associated with said financial account, said data indicating the club membership of said accepting customer, said financial institution operating on a second electronic infrastructure;
   (f) associating said implemented financial account of said accepting customer with an account number;
   (g) using a computing device to store in a database, associated with said financial banking institution, information respecting said financial account, associated with said accepting customer, at said financial institution, whereby said accepting customer information is input into said computer associated electronic database of identifications of consumer-customer club members having an associated financial account, and said accepting customer is identified in said database as a consumer-customer club member; and
   (h) for each of said consumer-customer club members, executing said algorithm to calculate the value of said relationship between said consumer-customer club member and said first retail establishment and said financial institution, said algorithm being a function of the extent to which a profile of the consumer-customer matches a profile desired by said businesses; and
   (i) designing a targeted offer for said accepting customer by executing an algorithm based on said valuation.

2. A method as in claim 1, wherein said receiving of an identification input is done via a card reader which is responsive to information bearing cards from a plurality of card responsive financial systems to execute said method to psychologically build loyalty in cardholders from multiple systems.

3. A method as in claim 1, wherein said valuation is increased if said consumer-customer club member is a card customer of said financial institution.

4. A method as in claim 1, wherein said received product data concerning said retail sales transaction with said customer is tallied to score products, products achieving sufficiently high scores being incorporated in said targeted offer.

5. A method as in claim 1, wherein said offering club membership to said customer is prompted by an onscreen display device associated with said electronic facility incorporating a checkout register functionality.

6. A method as in claim 5, wherein said electronically received identification input associated with said customer at said first retail establishment is determined by said computing device not to be associated with said financial institution, said computing device is programmed to allow method functionalities for a limited period of time using an existing financial card.

7. A method as in claim 1, wherein said customer redeems said offer, and the value of said relationship is not reduced by said customer redeeming said offer.

8. A method as in claim 7, wherein said algorithm executed to calculate the value of said relationship between said consumer-customer club member and said first retail establishment and said financial institution increases the value if the customer is a banking customer.

9. A method as in claim 8, wherein each of the businesses are located closer to each other than other businesses offering similar services.

10. A method as in claim 9, wherein said value rating algorithm is configured to generate increased value in response to information representing transactions associated with increased numbers of associated businesses patronized by said particular consumer-customer.

11. A method for psychologically building loyalty in customers of a plurality of associated retail enterprises each operating on its own electronic infrastructure by delivering consumer incentives tailored to customer valuation, one of said associated retail enterprises being a financial institution offering debit or credit card services, comprising:

(a) inputting, into a computer-associated electronic database the identification of consumer-customer club members, identification data associated with each of said consumer customer club members;

(b) receiving, at more than one retail location, each associated with one of said plurality of retail enterprises, in connection with a plurality of buying and banking retail transactions with said consumer-customer club member, product and service retail transaction data concerning retail transactions with said consumer-customer club member;

(c) receiving at said retail locations electronically an identification input associated with said consumer-customer club member;

(d) comparing said identification input to said identification data to determine whether said identification input is associated with a consumer-customer club member;

(e) associating said retail transaction data concerning retail transactions with said identification input in a database;

(f) gathering retail transaction data with respect to prior retail transactions and calculating the value of a relationship between the consumer-customer and at least one of said associated retail enterprises by assessing past retail transaction data relating to at least two of said retail enterprises, said value being increased where said consumer-customer has a card relationship with said financial institution;

(g) in response to a determination that said identification input is associated with a consumer-customer club member, executing an incentive generating rule in connection with said retail transaction to determine an incentive, said incentive generating rule being based at least in part upon said value; and (h) application of said incentive to said transaction, said value not being reduced in response to acceptance of said incentive.

12. A method as in claim 11, wherein calculation of the value of the relationship is based on the relationship with at least two of said retail enterprises.

13. A method as in claim 12, wherein said calculation of the value of the relationship is based on identification data is received at a plurality of said associated retail enterprises and wherein said valuation is based on the number of associated retail enterprises which receive said identification data, and wherein said value is calculated as a function of the extent to which a profile of the consumer-customer matches a consumer profile specified by said associated retail enterprises.

14. A method as in claim 12, further comprising
i) providing said consumer-customer with a financial account, said financial account being associated with an account number; and
(j) using a computing device to store in a database, associated with said financial institution, information respecting said financial account, associated with said accepting consumer-customer, at said financial institution.

15. A method as in claim 11, wherein said data is received by a checkout register.

16. The method as in claim 11, wherein said incentive generating rule is based at least in part upon said value and previous buying habits.

17. The method of claim 11, wherein the incentive generating rule is based on the value of a supplier of goods or services.

18. A method as in claim 11, wherein said incentive generating rule values the relationship with the customer based on prior executed transactions.

19. Apparatus for psychologically building loyalty in customers of facilities, including retail sales facilities and a financial institution, located at different locations by delivering consumer incentives tailored to customer preferences and customer valuation, comprising:

(a) an electronic computer-associated database comprising a first informational matrix storing the identification of consumer-customer club members and identification data associated with each of said consumer customer club members, said informational matrix including financial account information and retail sales information;

(b) a plurality of readers located at a plurality of respective locations associated with a plurality of retail establishments, each of said locations comprising equipment and/or materials for providing goods or rendering services, said plurality of readers being configured to receive electronically an identification input associated with said consumer-customer club member, each of said readers being associated with a different electronic infrastructure system, each of said electronic infrastructure systems being associated with additional readers;

(c) a plurality of transaction data input devices, associated with each location for receiving transaction data concerning a plurality of retail transactions, for products and services, with said consumer-customer club member;

(d) a computing system coupled to said transaction data input devices and said plurality of readers to receive said identification input and to receive said transaction data and store such information in a second informational matrix, associating said data concerning each retail transaction with said identification input;

(e) an algorithm resident in said computing system for calculating the value of a relationship between a particular consumer-customer and said retail establishments by assessing said data, associated with said particular consumer-customer, concerning said retail transactions with said retail establishments to generate a value rating, said algorithm being configured to indicate increased value in response to information respecting transactions associated with increased numbers of retail establishments associated with said particular consumer-customer, and the existence of a card account with said financial institution;

(f) an algorithm, responsive to said value, resident in said computing system for executing an incentive generating rule based on said value in connection with said retail transaction to determine an incentive; and (g) an output device responsive to said determined incentive for executing said incentive.

20. Apparatus as in claim 19, wherein said transaction data input device is a checkout register.

21. Apparatus as in claim 19, wherein said transaction data input device is a checkout register and wherein said computing system is programmed with a discount determining algorithm, and causes said discount to be printed or displayed at the checkout register.

22. Apparatus as in claim 19, wherein said algorithm for calculating the value of the relationship does not reduce the value of said relationship when said customer redeems said offer.

23. Apparatus as in claim 22, wherein said algorithm executed to calculate the value of said relationship between said customers increases the value if information respecting the customer is on an electronic infrastructure associated with said financial institution and electronic infrastructure associated with one of said retail sales facilities.

24. Apparatus as in claim 23, wherein each of the retail sales facilities are located closer to each other than other retail sales facilities offering similar products and services.

* * * * *